(12) United States Patent
Nichols et al.

(10) Patent No.: US 6,473,428 B1
(45) Date of Patent: Oct. 29, 2002

(54) MULTI-THREADED, MULTI-CAST SWITCH

(75) Inventors: Stacy Nichols, Kanata; David A. Brown, Carp, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/223,836

(22) Filed: Dec. 31, 1998
(Under 37 CFR 1.47)

(51) Int. Cl.$^7$ ............................................... H04L 12/28
(52) U.S. Cl. ................................................... 370/395.1
(58) Field of Search ................................ 370/474, 469, 370/395–410, 413, 399–398, 244, 416, 427, 360, 466, 401, 394, 396–397, 232, 252, 417, 412, 468, 498, 388–389, 455

(56) References Cited

U.S. PATENT DOCUMENTS

| | | | |
|---|---|---|---|
| 5,241,536 A | * | 8/1993 | Grimble et al. ............. 370/416 |
| 5,550,815 A | * | 8/1996 | Cloonan et al. ............. 370/396 |
| 5,572,522 A | * | 11/1996 | Calamvokis et al. ........ 370/390 |
| 5,802,052 A | * | 9/1998 | Venkataraman ............. 370/395 |
| 5,903,563 A | * | 5/1999 | Rashid et al. ................ 370/394 |
| 6,034,960 A | * | 3/2000 | Beshai et al. ................ 370/395 |
| 6,091,728 A | * | 7/2000 | Lazraq et al. ................ 370/395 |

OTHER PUBLICATIONS

Xiong et al., On the Performance Evaluation of an ATM Self–Routing Multistage Switch with Bursty and Uniform Traffic, Feb. 1993, IEEE, entire document.*

* cited by examiner

Primary Examiner—Kwang Bin Yao
Assistant Examiner—Prenell Jones

(57) ABSTRACT

A multi-stage switch includes a plurality of switching elements for routing cells from input components to output components. Internal switch logic routes incoming cells to the output components in the same temporal order as they are received from the input components, and sequentially activates the switching elements to distribute the cells evenly within the switch.

26 Claims, 12 Drawing Sheets

MULTI-THREADED, MULTI-CAST SWITCH

REFERENCE TO RELATED APPLICATION

The present application is related to application of David A. Brown, David Stuart, and Stacy Nichols, filed on Dec. 5, 1997 and entitled "Link List Block Allocation Method and Structure for Queuing Pointers in Memory," which is incorporated herein by reference.

FIELD OF THE INVENTION

The present invention relates to a multi-stage switch for transmitting electrical signals such as cells or packets.

BACKGROUND OF THE INVENTION

FIG. 1 illustrates a conventional multi-stage switch. The switch includes first-stage multiplexers 100, each referred to as a switch fabric card (SFC), receiving a plurality of signals. A third stage includes demultiplexers 102. Between the first and third stages lies a second stage, including switches 101. Switches 101 control the transmission of signals from the first stage to the third stage. After the first stage receives signals, the second stage queues and sends them to a particular one of the third-stage demultiplexers. Thus, the second-stage switches route incoming signals from the first stage to a particular one of the third stages.

In certain multi-stage switches, the second-stage switches may experience a "bottleneck" if too many signals pass through a particular one of the second-stage switches. Designing such switches therefore involves determining how to distribute the signals from the first stage among the switches in the second stage. When multi-stage switch systems transmit too many signals through one of the second-stage switches, those systems do not use all switches in the second stage most efficiently. As a result, system performance degrades.

In addition, multi-stage switches must perform processing to track the signals, which slows their performance. Also, certain applications require maintaining the incoming signals in the same order, which also involves processing that can decrease the speed of the switch.

SUMMARY OF THE INVENTION

A multi-stage switch consistent with the present invention includes a plurality of output circuits, a plurality of input circuits containing cells destined for at least one of the output circuits, a plurality of switches for receiving the cells from a particular one of the input circuits and transmitting the cells to a particular one of the output circuits, and a scheduler circuit for transferring cells from an input circuit to an output circuit in the same temporal ordering, and distributes cells evenly across the middle stages to eliminate bottlenecks. A method consistent with the present invention transmits cells through a multi-stage switch. The method comprises queuing a plurality of cells in a plurality of input circuits, each of the cells being destined for at least one of a plurality of output circuits, and transmitting the cells, through a plurality of switches, from the one of the input circuits containing that cell to the ones of the output circuits for which the cell is destined by routing the cells in essentially the same temporal order as the cells are transmitted from the input circuits to the switches.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Reference will now be made in detail to embodiments consistent with this invention that are illustrated in the accompanying drawings. The same reference numbers in the different drawings generally refer to the same or like parts.

Switches consistent with the present invention include multiple input circuits with queues for holding cells according to the output port to which the cells are destined. A queue can include a buffer, or any other type of component, circuit, or device for buffering cells or other information in order. Switches consistent with this invention may also include a scheduler circuit to select the second-stage switches to distribute incoming cells evenly and to ensure that cells destined for a specific output are evenly distributed across all second-stage switches. Thus, one cell for a given output goes to the second-stage switch, and the next cell for the same output goes to the next second-stage switch. This process repeats for each cell at the input destined for the same output.

The second-stage switches transmit the cells to the output ports and coordinate cell transfers between inputs and outputs. For example, the second-stage switch with the earliest cell for a given output from a specific input transmits that cell to the output and conveys its cell transfer operation to the next second-stage switch. The next second-stage switch can then transfer a cell between the same input-output pair as the first second-stage switch.

To ensure transfer of cells between inputs and outputs at a maximum rate, switches consistent with this invention can use a switch fabric of scheduler circuits in the first and second-stages with a predictive circuit to reduce the time taken to decide which cell to send. Based on the number of cells queued for a given output, the predictive circuit in the first stage determines if it is possible to send a cell via the second-stage fabric.

Figure 1:
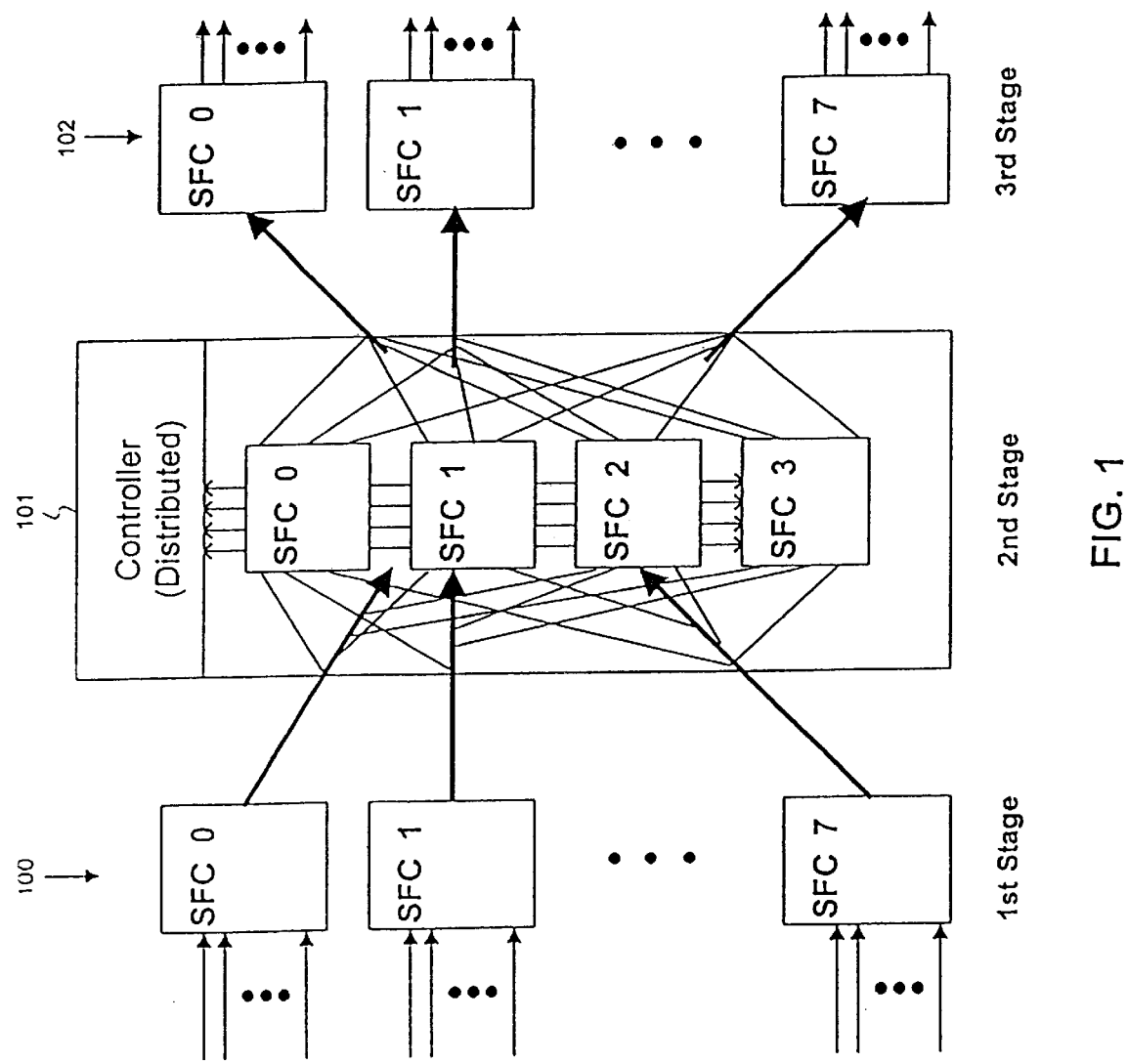
FIG. 1 is block diagram of a conventional multi-stage switch.
Figure 2A:
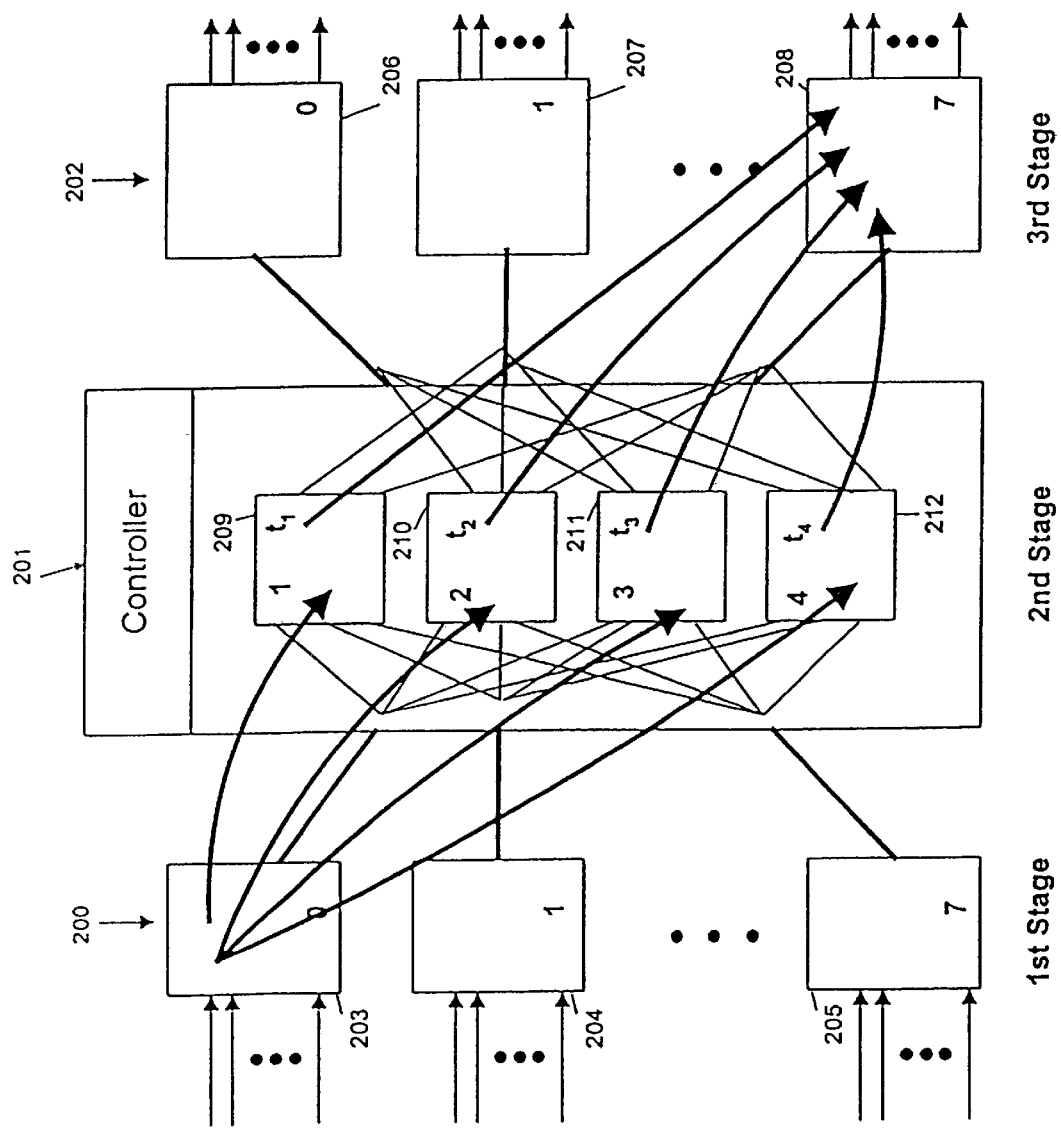
FIG. 2A is a cell distribution diagram of cells passing through a multi-stage switch.

FIG. 2A is a block diagram of a system consistent with this invention illustrating how second stages (201) transfer cells from a first stage 200 to a third stage (202). The system shows cells from component 203 in the first stage destined for component 208 in the third stage. Each of the signals from component 203 is evenly distributed among the four switches in controller 201, and each of the four cells is generally transmitted in sequence to its intended third stage component 208 to maintain correct temporal ordering as required for certain applications. Controller 201 evenly distributes incoming signals among the four switches to optimize the performance and efficiency of the switch.

The first stage 200 includes components 203, 204, and 205, functioning as multiplexers. The third stage includes demultiplexers 206, 207, and 208. Although the first and second stages are shown with eight components each, the number of components is not important.

FIG. 2A also shows multiple threads, a thread referring to a particular path from the first stage components through one of the second-stage switches to the third-stage components. Each of the bold lines in FIG. 2A illustrates a cell to be transmitted. A cell may contain data, such as a packet of information as well. In this example, cell 1 arrives at component 203 and is forwarded to component 209 in the second stage 201. At time t1, cell 1 is dequeued from second stage 201 and transmitted to component 208 in the third stage 202. Cell 2 is forwarded to switch 210 in second stage 201, and at time t2 is transmitted to a component 208 in third stage 202. Cell 3 arrives and is transmitted to the third switch 211 in second stage 201, and at time t3 is transmitted to component 208 in third stage 202. Finally, cell 4 arrives and is transmitted to switch 212 in second stage 201 and is subsequently dequeued at time t4 and transmitted to component 208 in third stage 202. In this example, the times t1–t4 are of increasing magnitude such that the cells are distributed among the four switches, subsequently dequeued in sequence, and transmitted to their destination components in the third stage with correct temporal ordering at the output port.

Figure 2B:
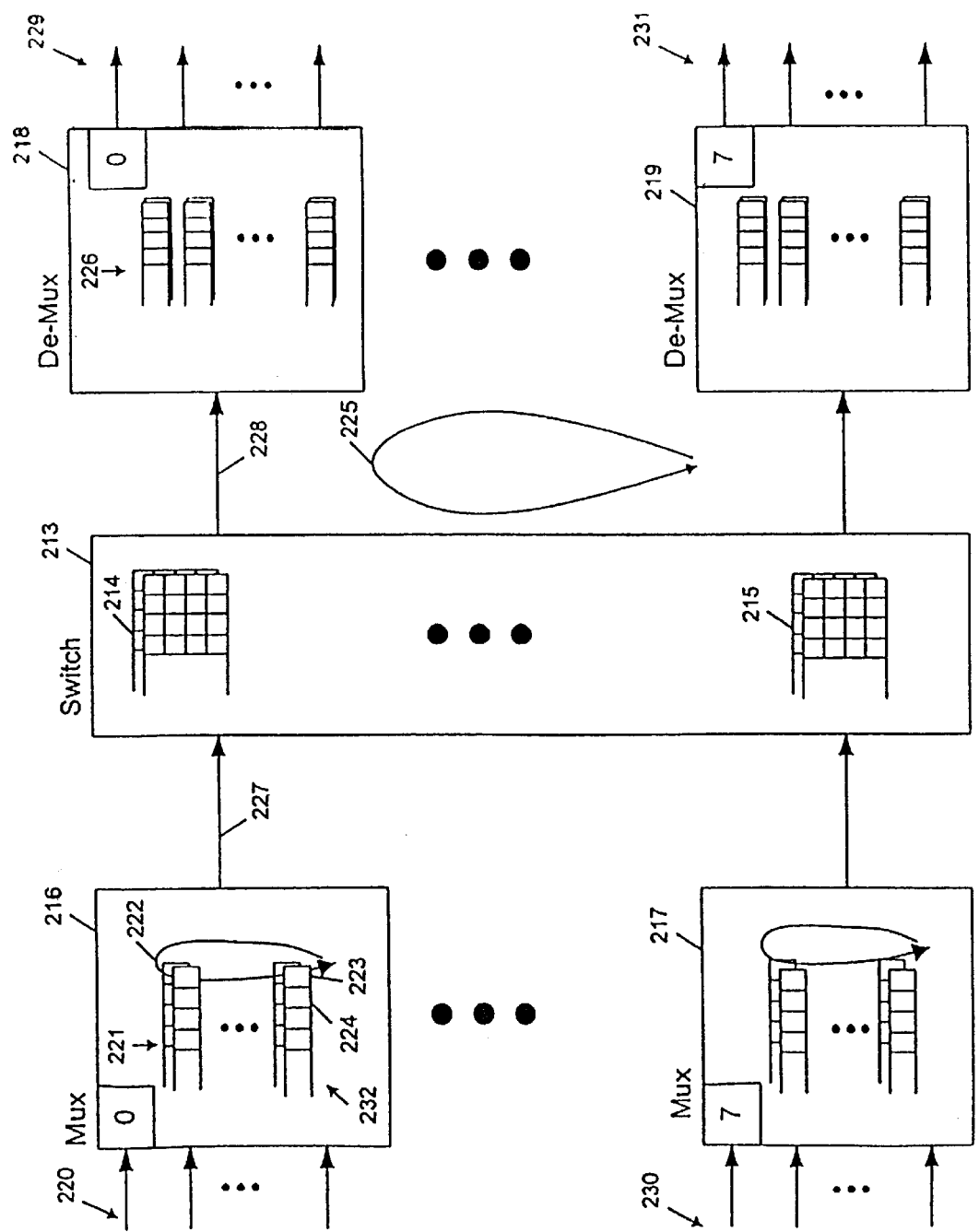
FIG. 2B is a diagram illustrating operation of a multi-stage switch consistent with the present invention.

FIG. 2B is a diagram logically illustrating operation of a multi-stage switch consistent with the present invention. A second-stage switch 213 routes cells from input components, such as 216 and 217, in a first stage, to output components, such as 218 and 219, in a third stage. Although only two are shown, this example includes eight input components and eight output components. Input components 216 and 217 in the first stage receive incoming cells on lines 220 and 230, respectively. Each input component includes several queues, for example queues 221 in input component 216, and these queues receive cells from lines 220. Each input component typically contains at least one queue corresponding to each of the eight output components, and each incoming cell is held in the queue corresponding to the output component for which it is destined.

Line 222 logically illustrates a selector rotating through the queues to select cells for transmission. As explained in more detail below, the selector determines whether it has previously selected a particular queue 232 for transmitting a cell 223. If so, it determines that a cell 224 exists behind cell 223 for transmission, and can select queue 232 again to transmit cell 224. In this example, queue 232 has a previous status of having been selected, and a pending status indicating that cell 224 exists. If no more cells exist in queue 232 for transmission, the selector rotates to select the next queue. The selector may sequentially rotate through the queues or, alternatively, rotate according to another sequence.

The input components function as multiplexers, and line 227 represents a logical connection between input component 216 and switch 213. Cells are selected from the queues in input component 216 and transmitted along connection 227 to switch 213. A selector also rotates through the switch components, as logically shown by line 225, for selecting input components. Switch 213 in the second-stage contains several queues, for example, queues 214 and 215, for holding and transmitting cells between input components and output components.

In the third stage, cells are transmitted to output components, which function as demultiplexers. For example, line 228 represents a logical connection between switch 213 and output component 218. The output components typically contain queues, for example, queues 226 in output component 218, for queuing cells. Output components 218 and 219 demultiplex and transmit cells on output lines 229 and 231, respectively.

Figure 3:
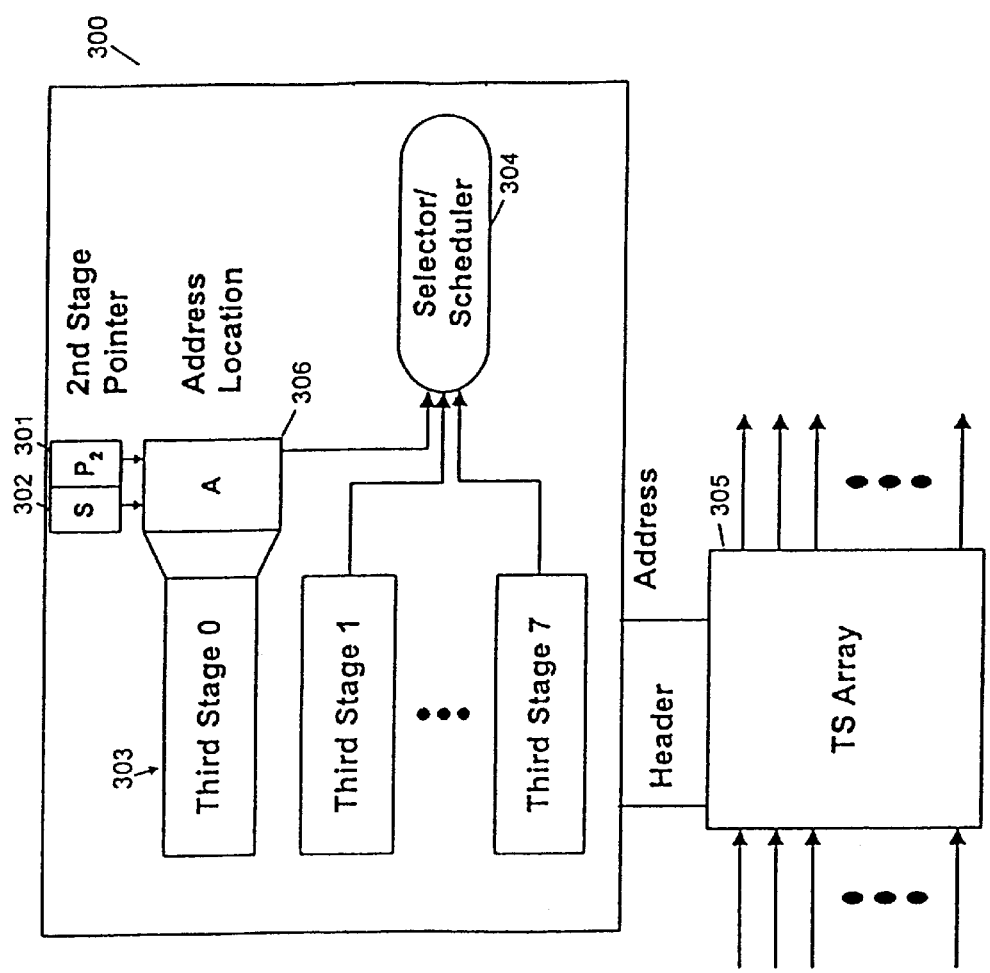
FIG. 3 is a block diagram of a first stage within the multi-stage switch of FIG. 2B.

FIG. 3 is a block diagram of circuitry for queuing cells in the first stage. The primary task of the first stage is to determine the destination third-stage fabric of a cell. In one embodiment, the first stage includes one queue per output component to store cells that are not transferred to the second stage as quickly as they arrive. A second-stage counter indicates the second stage to which the queue currently points, thus showing which second-stage switch is currently selected to transmit a cell. A scheduler 304 determines which queue or incoming cell is to be transmitted to the second stage. Each first stage component typically functions similarly.

Control circuitry 300 includes a selector/scheduler 304 for prioritizing and transmitting cells to the second stage. An address location queue 306 includes the address of a cell in the queue, and elements 303 identify the destination third-stage component or port for a particular cell. Component 302 stores the size of a queue, and second-stage pointer 301 is a counter that distributes cells evenly among the second-stage switches. When a cell is transmitted, the counter in pointer 301 increments to point to the next second-stage switch, meaning that the next second-stage switch is selected to receive a cell. A time switch (TS) array 305 stores cells to be transmitted. Header information identifies the header bits of a cell and an intended destination of the cell.

Control circuitry 300 transmits cells to the second-stage switches. In particular, when a cell arrives the circuitry 300 determines the destination output port for that cell, and queues it into the corresponding output queue in the first stage. Circuitry 300 also determines a second-stage fabric destination by consulting the second-stage pointer to find the second-stage switch for the cell. Selector/scheduler 304 transmits the cell to the second stage for transmission to the intended third stage through the selected second-stage switch. Finally, control circuitry 300 advances the output queue in order to schedule the next cell.

Figure 4:
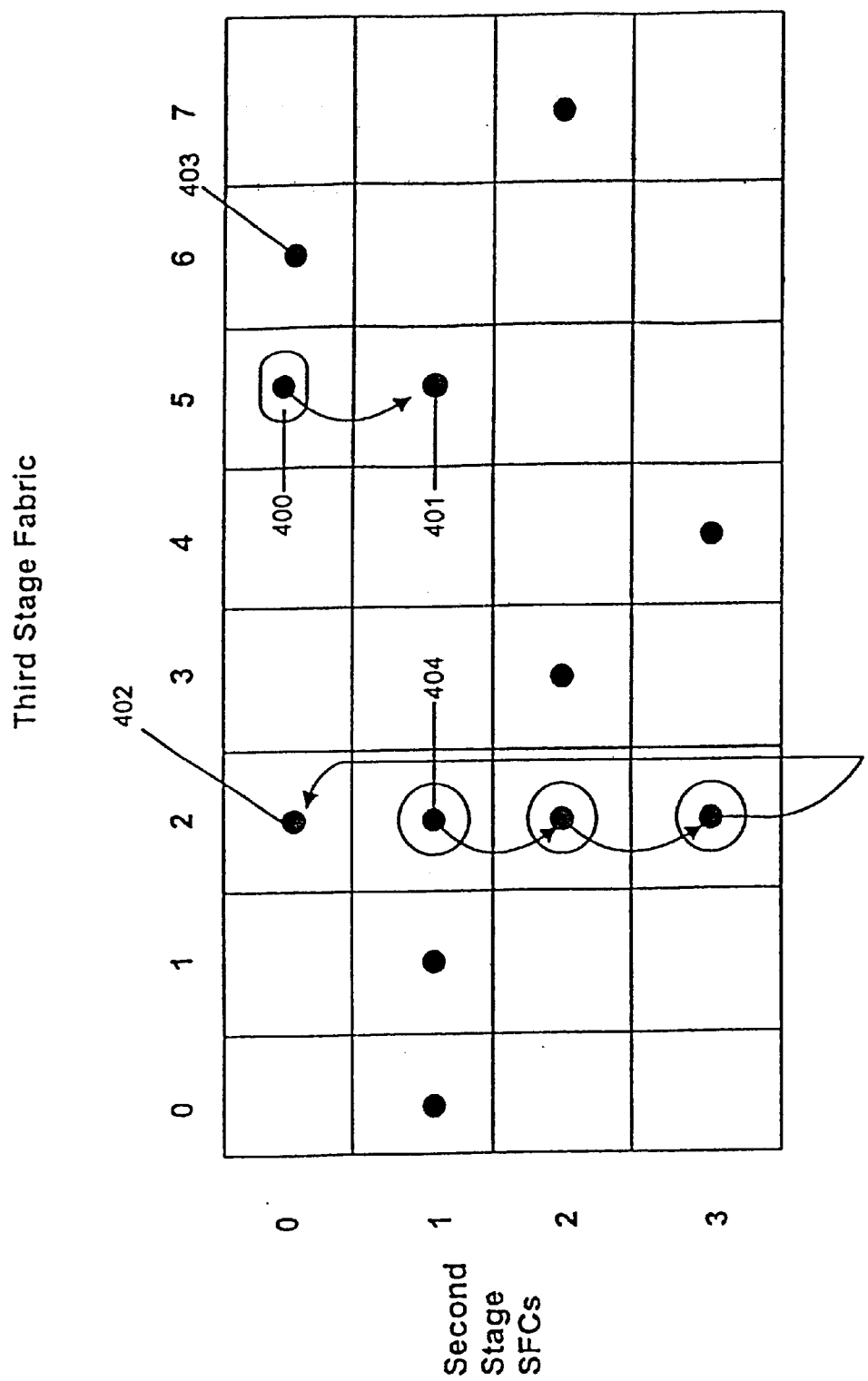
FIG. 4 is a diagram of a first-stage selector algorithm for distributing signals in the multi-stage switch of FIG. 2B.

FIG. 4 is a diagram illustrating the first-stage selector algorithm by which selector/scheduler 304 schedules the transmission of cells to the second stage. The columns identify the third-stage components and the rows identify the second-stage switches. Each dot represents a cell destined for a particular third-stage component and intended to be transmitted through a particular second-stage switch. The dots thus represent active output ports. For example, marker 403 represents a cell at the head of the queue for the third-stage fabric and destined to be transmitted via second-stage switch 0. In this diagram the arrow represents the processing of cells to be transmitted through the second-stage switches. As indicated above, a counter rotates the queue through each of the second-stage switches to distribute the cells among the second stage evenly.

The solid black dots represent a cell at the head of the queue in the first stage, waiting for transmission to the second stage. The shaded dots represent cells located behind the first cell in a queue at the first stage. After transmitting the first cell, a scheduler circuit determines whether another cell exists behind the first (now transmitted) cell. If so, the scheduler circuit will consider it for transfer to the next-stage fabric. By considering pending cells, the scheduler can provide a sustained maximum throughput.

The switch uses several signals to identify the status of different queues. "Pending" refers to a cell waiting to be transmitted, and "previous" refers to a queue previously selected to transmit a cell. A "pending status" refers to whether a cell is waiting to be transmitted in a particular queue, and a "previous status" refers to which queue was selected to transmit a cell.

The use of a "pending status" and a "previous status" in determining transmission decisions results in increased efficiency of a multi-stage switch. For example, if the "previous status" indicates that a particular queue had been selected, and the "pending status" indicates that another cell exists in that queue to be transmitted, the scheduler can efficiently select that same queue to transmit the pending cell again.

As shown in FIG. 4, the queue may begin at marker 400 and select one cell to be sent through second-stage switch 0. The queue then moves down to select a cell for second-stage switch 1, and selects marker 401 indicating a cell destined for third stage component 5. Because no additional cells remain to be transmitted to third stage component 5, the queue moves across to marker 404 indicating a cell to be transmitted to a third-stage component 2 through second-stage switch 1. The queue then rotates through the other switches because additional cells remain to be transmitted to third-stage component 2. The process repeats when the queue reaches marker 402. Accordingly, the queue rotates through the four second-stage switches, and in doing so identifies cells to be transmitted to particular components in the third-stage fabric.

Figure 5:
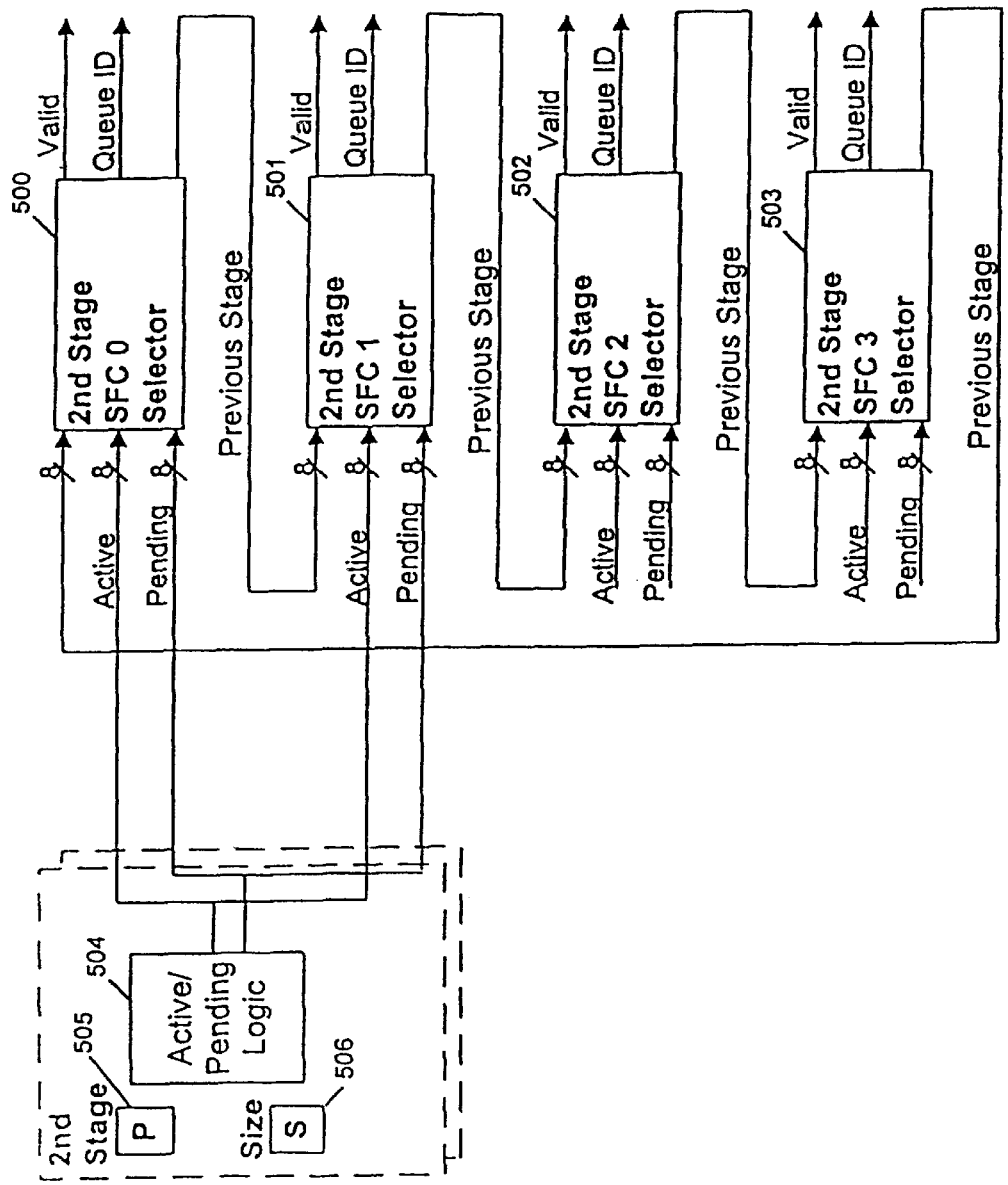
FIG. 5 is a block diagram of the first-stage selector circuitry for the multi-stage switch of FIG. 2B.

FIG. 5 is a block diagram of the first stage selector. The first stage includes four selectors 500, 501, 502, and 503, one for each of the four switches in the second stage. Each of the second-stage selectors receives three inputs. The first input is a "previous stage" signal, which may be an eight-bit signal having one bit per output indicating which output port the previous stage selected. The second is an "active signal," which may be an eight-bit input including one bit per output port, indicating which second-stage switch should be traversed for a given output. The third is a "pending input" signal, which may include an eight-bit signal with one bit per output indicating that the output queue has a cell to be transmitted to the second stage, but that the second stage is not active. The "pending input" signal represents a cell'eligibility for transfer to a given second-stage port once that port transmits the current "active" cell.

The second-stage selectors 500–503 generate three outputs. The "previous stage" output includes the signals identified above. A "valid" signal output includes a bit identifying whether the queue ID is valid, meaning whether there is data to send. A "queue ID" output signal identifies the output queue to be transmitted to the specified second-stage fabric. The "active" and "pending" input signals are generated by active pending logic block 504, which includes the second-stage pointer register 505 and a size register 506 for the cells to be transmitted. The system preferably includes active/pending logic generation for each output queue, although, of course, other architectures are possible.

Figure 6:
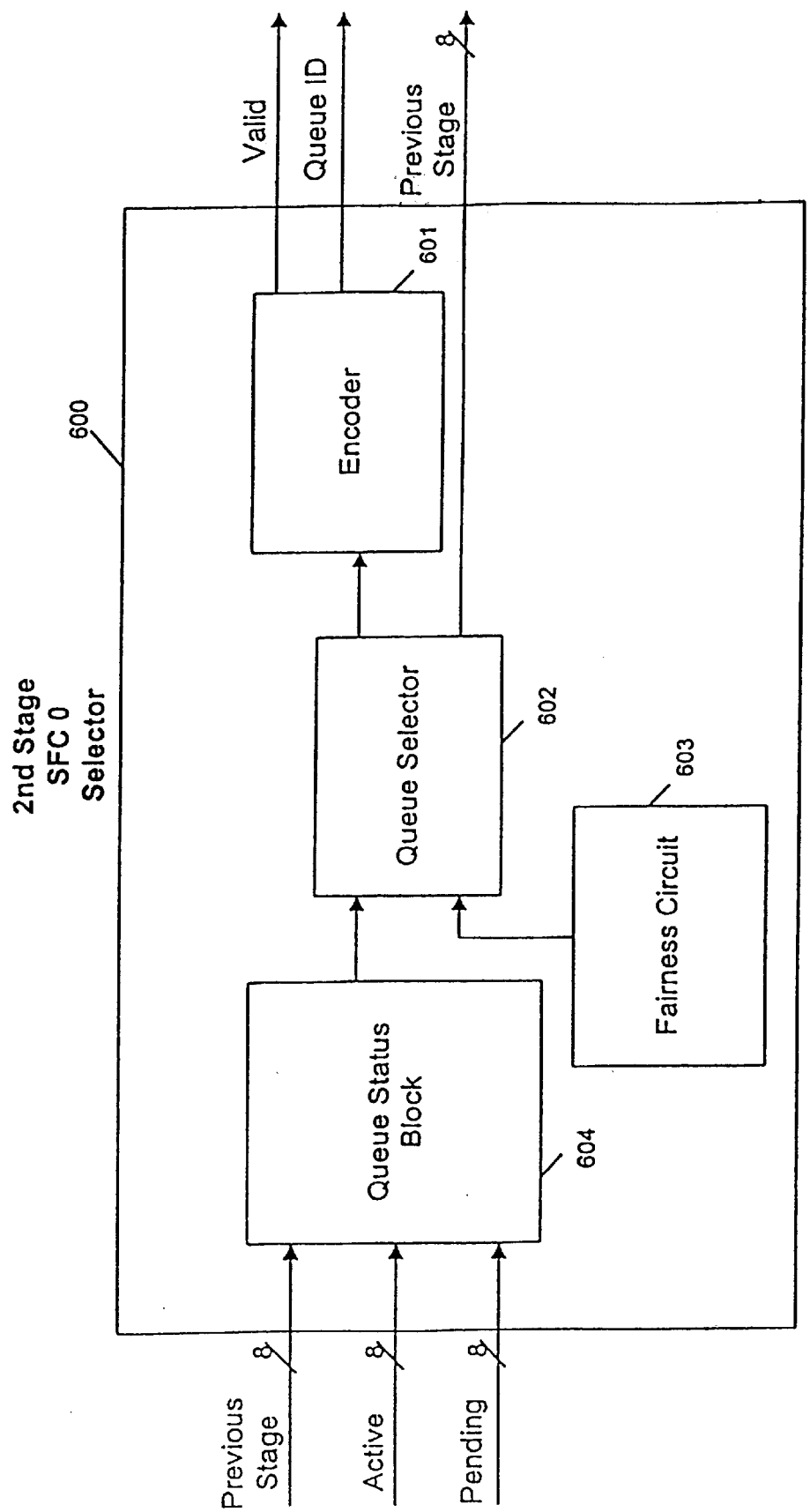
FIG. 6 is a block diagram of components of a first-stage selector.

FIG. 6 is a block diagram of the components of a possible design for a second-stage selector such as selectors 500–503 shown in FIG. 5, located in the first stage. A second-stage selector 600 includes a queue status block 604 with a unit containing the status of each output port: "active" or "pending" and previous cells present. A queue selector circuit 602 includes an arbiter circuit that scans all queues and selects one to service. A fairness circuit 603 includes a counter that rotates the starting point per the selector circuit, and evenly distributes cells among the switches ensuring that no single output queue can dominate the selection algorithm. An encoder circuit 601 receives the output of the queue selector 602 and translates it into a three- or four-bit number.

Figure 7:
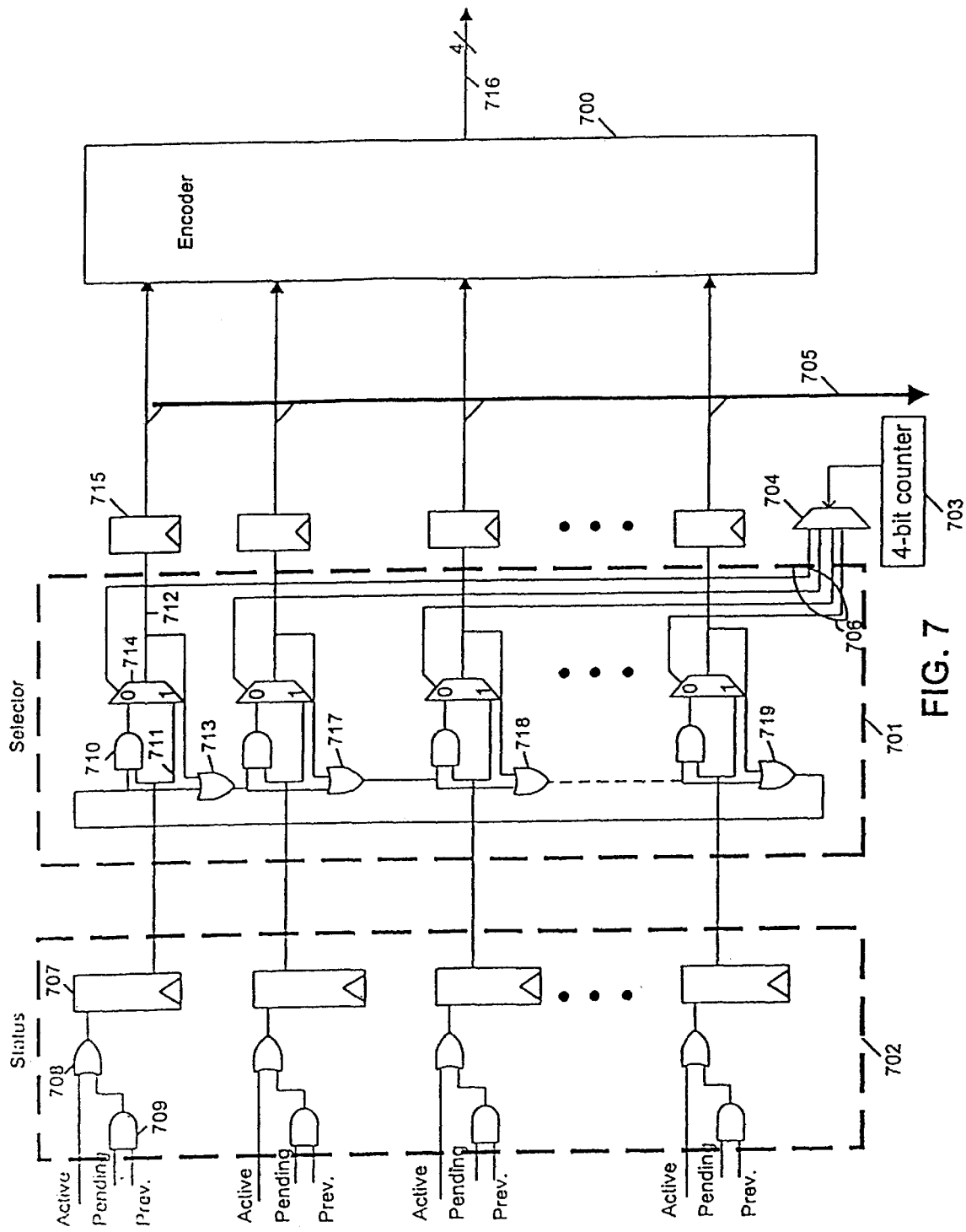
FIG. 7 is a logic diagram of a first-stage selector.

FIG. 7 is a logic diagram of a possible first stage selector, such as selector 600 shown in FIG. 6. In FIG. 7, selector 701, which includes eight selectors for the eight input stages, receives a signal from status block 702. Selector 701 also outputs signals to encoder 700, which encodes the eight-bit value into a three- or four-bit number. Line 705 contains the previous stage signal, which is input to the status block 702. A four-bit counter 703 implements fairness among the second-stage selectors by providing each multiplexer in selector 701 an initial opportunity to transmit a cell to the second stage. Specifically, counter 703 counts the starting point per the selector circuit 701 and evenly distributes each port'opportunity to transmit a pending cell to the second stage.

The selector logic operation for the first port functions as follows. When counter 703 and multiplexer 704 select multiplexer 714, it retrieves a signal on line 711 from queue 707, indicating a cell to be sent if there is either an "active" signal present or a "pending" and "previous" signal present. This determination is made by logically ORing the "active" signal using OR gate 708 with the output of AND gate 709, which receives the "previous" and "pending" signals.

Multiplexer 714 transmits the signal at its output 712 through queue 715 to encoder 700. OR gate 713, as well as OR gates 717, 718, and 719 in that vertical chain, shut down the remaining multiplexers in the selector to ensure that only multiplexer 714 is selected. In addition, AND gate 710 logically combines the transmission decision and previous status with the pending status to make a decision concerning a cell to transmit. The vertical chain of OR gates propagates a transmission decision to the other multiplexers in the chain because the decision may affect the pending and previous status. The transmission decision typically must propagate quickly to the other multiplexers to avoid reducing the speed of the switch too much. Encoder 700 receives eight bits from the selector identifying at most one pathway and converts each bit into a three- or four-bit number. For example, the encoder may convert the eight-bit binary number into a four-bit binary-coded decimal (BCD) number for output on line 716.

Figure 8:
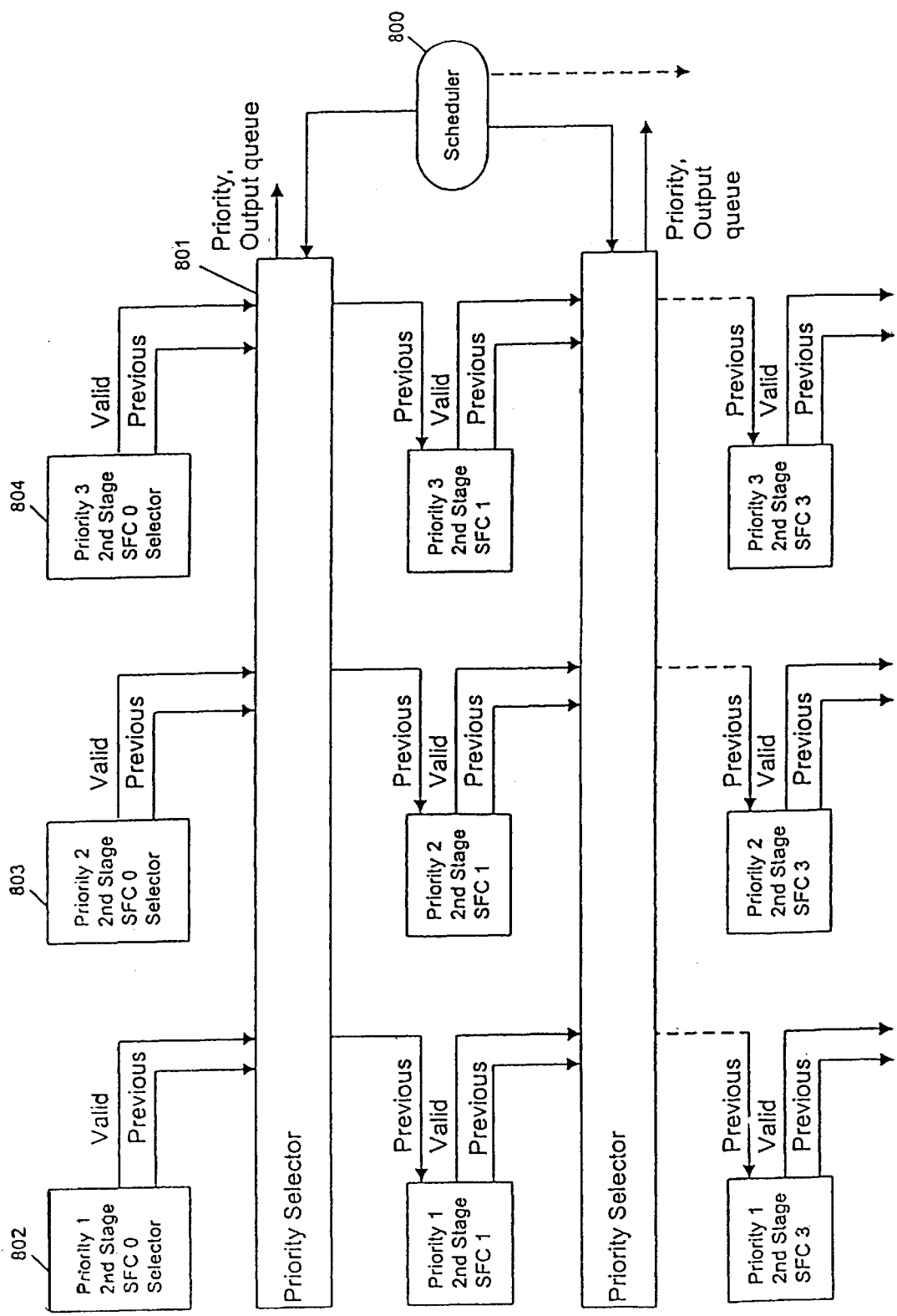
FIG. 8 is a block diagram of logic for insertion of priorities in the distribution of signals within the multi-stage switch of FIG. 2B.

FIG. 8 is a block diagram of logic for inserting priorities into the selection circuitry. This logic typically includes a priority selector for each second-stage switch. For example, priority selector 801 corresponds to second-stage switch 0 and may insert priorities through priority blocks 802, 803, and 804. A scheduler 800 selects a top priority, and in this example each second-stage switch may have independent priorities. Priority selector 801 determines which priority to send, such as a top priority 802 or lower priorities 803 or 804. Priority selector 801 also propagates the valid and previous stage signals for the selected priority and nulls all other valid and previous signals. The priority selectors for the other second-stage switches may operate in a similar manner. Each priority block, 802, 803, and 804, typically contain the same logic as shown in FIG. 7 in that each first stage component makes transmission decisions based upon which third stage component a cell is destined for and which third stage component it was received from.

Figure 9:
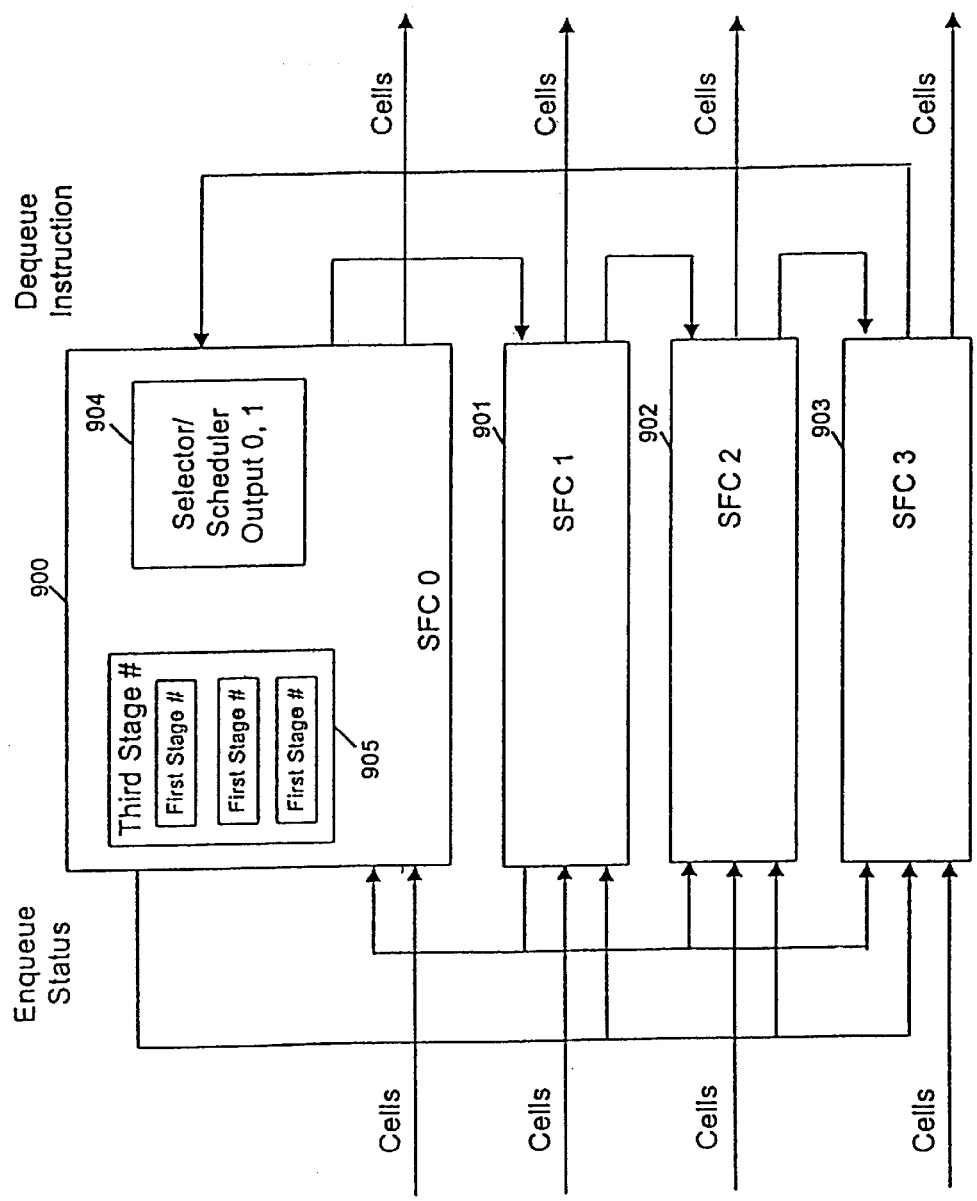
FIG. 9 is a block diagram of second-stage components within a multi-stage switch.

FIG. 9 is a block diagram of one implementation of a second-stage switch and its components. This block diagram illustrates an implementation of switches 900, 901, 902, and 903 for the second-stage switches, as shown in the above figures. Each second-stage switch queues arriving cells by destination, source, and priority, and then broadcasts that status to all other second-stage components. Each controller, such as controller 904, issues instructions to all fabrics as to which cells to dequeue for a given third-stage switch. For example if these cells were stored in an import buffer for a specific output, the selector circuit 904 would indicate to the scheduler that it was possible to send cells for that output to three consecutive second-stage fabrics.

The selector circuit 904 in the second stage is also designed to enable maximum throughput based on the number of cells pending transfer between a given input/ output pair.

The second stage has a scheduler circuit per third-stage fabric. Each scheduler circuit determines which cell should be transferred from the second-stage fabric to the associated third-stage fabric. The schedulers employ the selector circuits to ensure full-rate transfer of cells from the second stage to the third stage. In addition, each switch contains third-stage queues 905. The other switches 901–903 may contain similar logic. The selector logic is similar to that described in the description of the first stage.

Figure 10:
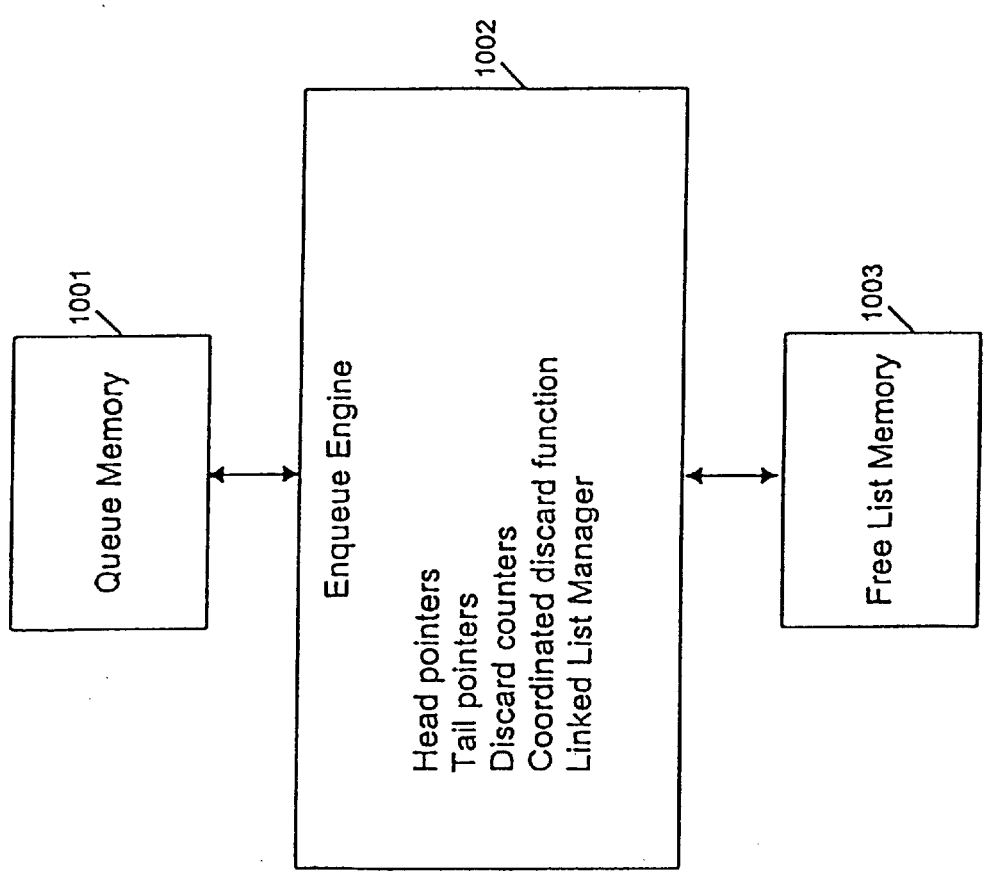
FIG. 10 is a block diagram of a second-stage queue structure.

FIG. 10 is a block diagram of one implementation of a second-stage queue structure. A queue engine 1002 manages the data structures, which include head pointers, tail pointers, discard counters, a linked list manager, and a coordinated discard function. A queue memory 1001 contains the cells to be transmitted. A free list memory 1003 identifies free memory for receiving new information, such as new cells to be transmitted. A linked list manager may manage the head pointers and tail pointers in a linked list, as is known in the art. Each of the pointers identifies a cell in memory. The coordinated discard function of the queue engine ensures that if one unit drops a cell, all other second-stage selectors drop the same type of cell (e.g., output, input, or priority) to maintain correct temporal ordering at the output ports. Examples of structures for storing cells in memory may be found in the U.S. patent application of David A. Brown, David Stuart, and Stacy Nichols, filed on Dec.5, 1997 and entitled "Link List Block Allocation Method and Structure for Queuing Pointers in Memory."

Figure 11:
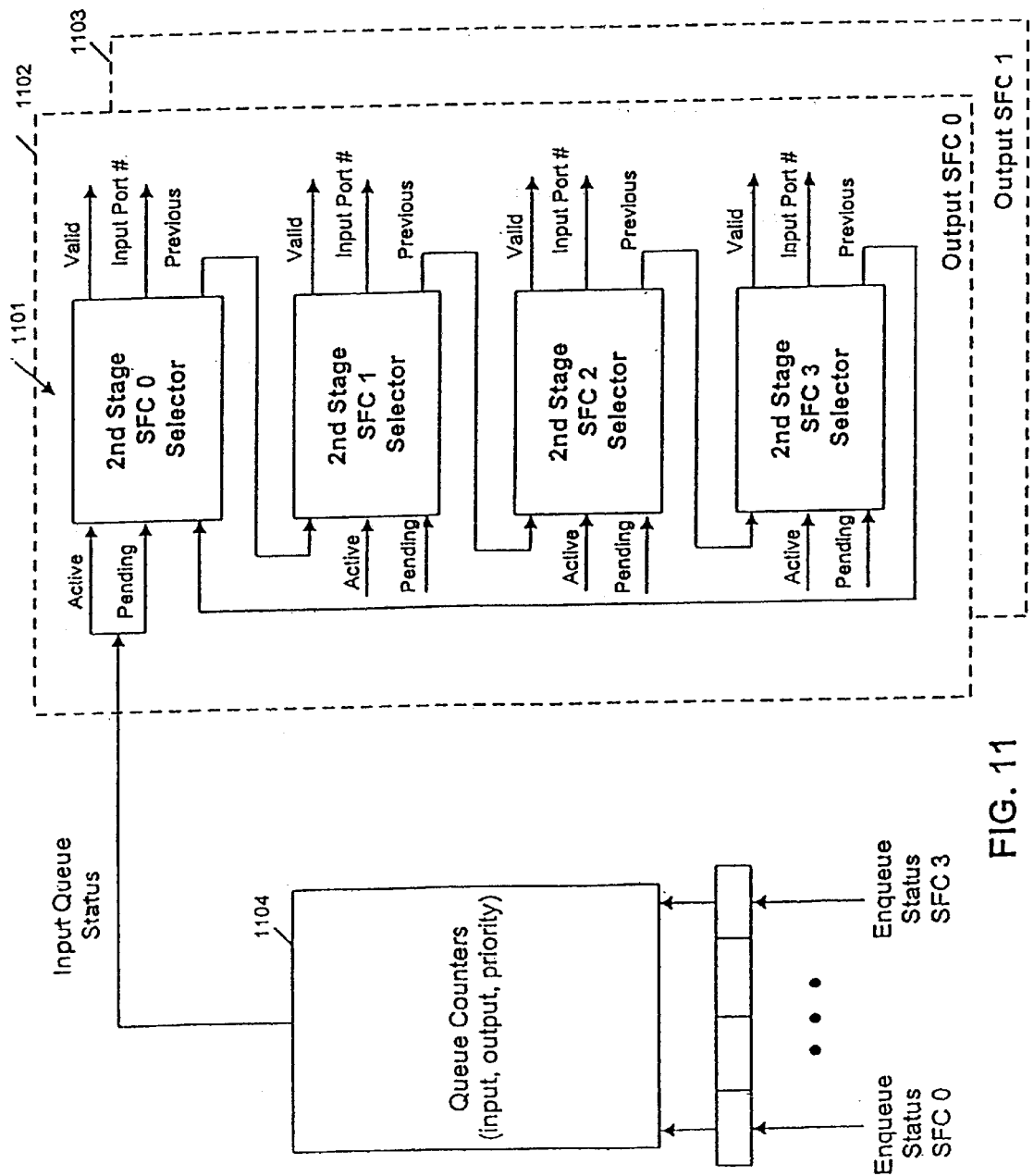
FIG. 11 is a block diagram of the second-stage controller.

FIG. 11 is a block diagram of the second-stage controller. The second-stage controller includes blocks 1102 and 1103, for example, one for each output port. In this example, therefore, the second-stage controller includes eight components having the logic shown in block 1102. Each second-stage controller 1102 includes selectors 1101 functioning as described above with respect to the first-stage controller. In addition, a queue counter 1104 provides the input queue status, including priorities, and counts cells providing information concerning the number of active and pending cells available.

Although the present invention has been described in connection with exemplary embodiments, many modifications will be readily apparent to those skilled in the art, and are intended to fall within the scope of the appended claims. For example, different size queues or queues in the first and third stages, and a different number of switches in the second stage, may be used without departing from the scope of the invention. This invention should be limited only by the claims and equivalents thereof.

What is claimed is:

1. A multi-stage switch comprising:

a plurality of output circuits;

a plurality of input circuits containing cells, each of the cells being destined for at least one of the output circuits;

a plurality of pending signals, each one of the plurality of pending signals associated with one of the plurality of input circuits, for indicating a presence of a new cell at the corresponding input circuit;

a plurality of switches for receiving the cells from the input circuits and transmitting he cells to the destined ones of the output circuits; and a scheduler circuit for causing the switches to the cells to the output circuits in essentially the same temporal order as the cells are received from the input circuits to the switches in response to plurality of pending signals.

2. The multi-stage switch of claim 1 wherein the scheduler circuit further includes a circuit for transmitting cells from the input circuits to the switches in the same temporal order as the cells were received at the input circuit.

3. The multi-stage switch of claim 1 wherein the input circuits include a multiplexer having a plurality of inputs for receiving data and having an output coupled to each of the switches.

4. The multi-stage switch of claim 1 wherein the output circuits each include a demultiplexer having an input coupled to each of the switches and having a plurality of outputs.

5. The multi-stage switch of claim 4, further including an encoder coupled to the queue selector circuit for translating an output of the queue selector circuit into a number.

6. The multi-stage switch of claim 4, further including an encoder for receiving an eight-bit signal from a queue selector circuit and encoding the signal.

7. A multi-stage switch, comprising:

a plurality of output circuits;

a plurality of input circuits containing cells, each of the cells being destined for at least one of the output circuits;

a plurality of switches for receiving the cells from the input circuits and transmitting the cells to the destined ones of the output circuits;

a scheduler circuit for causing the switches to transmit the cells to the output circuits in essentially the same temporal order as the cells are received from the input circuits to the switches, wherein the scheduler circuit includes:

means for determining whether a cell is pending after a cell has been transmitted; and means for transferring a pending cell to the next stage.

8. The multi-stage switch of claim 1 wherein the scheduler circuit includes a queue status circuit for indicating a status associated with the input circuits;

a queue selector circuit, coupled to the queue status circuit, for selecting a particular one of the input circuits based upon the status; and a controller circuit, coupled to the queue selector circuit, for selecting the switches in a pre-defined sequence.

9. A multi-stage switch, comprising:

a plurality of output circuits;

a plurality of input circuits containing cells, each of the cells being destined for at least one of the output circuits;

a plurality of switches for receiving the cells from the input circuits and transmitting the cells to the destined ones of the output circuits;

a scheduler circuit for causing the switches to transmit the cells to the output circuits in essentially the same temporal order as the cells are received from the input circuits to the switches, wherein the scheduler circuit includes a queue status circuit for indicating a status associated with the input circuits;

a queue selector circuit, coupled to the queue status circuit, for selecting a particular one of the input circuits based upon the status wherein the queue selector circuit includes an input signal indicating an output port selected by a previous stage;

an input signal indicating which second-stage switch should be traversed for a given output; and an input signaling indicating that an output queue has a cell to be transmitted to the second-stage, but that the second-stage is not active; and a controller circuit, coupled to the queue selector circuit, for selecting the switches in a pre-defined sequence.

10. The multi-stage switch of claim 8 wherein the queue status circuit further includes means for determining a status of arriving cells; and means for broadcasting the status.

11. The multi-stage switch of claim 10 wherein the means for determining the status of arriving cells further includes means for determining a source;

a destination; and a priority for each of the cells.

12. A multi-stage switch, comprising:

a plurality of output circuits;

a plurality of input circuits containing cells, each of the cells destined for at least one of the output circuits;

a plurality of switches for transmitting the cells from the input circuits to the destined ones of the output circuits; and a scheduler circuit for transmitting the cells from the input circuits to the switches based upon a "pending status" and a "previous status" of cells within the input circuits.

13. The multi-stage switch of claim 12 wherein the input circuits each include a multiplexer having a plurality of inputs for receiving data and having an output coupled to each of the switches.

14. The multi-stage switch of claim 12 wherein the output circuits each include a demultiplexer having an input coupled to each of the switches and having a plurality of outputs.

15. The multi-stage switch of claim 12 wherein the scheduler circuit includes:

a queue status circuit for indicating the pending status and the previous status;

a queue selector circuit coupled to the queue status circuit for selecting a particular one of the input circuits based upon the pending status and the previous status; and a circuit coupled to the queue selector circuit for sequentially selecting the switches.

16. The multi-stage switch of claim 15, further including an encoder coupled to the queue selector circuit for translating an output of the queue selector circuit into a number.

17. A method of transmitting cells through a multi-stage switch, comprising:

queuing a plurality of cells in a plurality of input circuits, each of the cells being destined for at least one of a plurality of output circuits; and transmitting each of the cells, through a plurality of switches, from the one of the input circuits containing that cell to the ones of the output circuits for which the cell is destined by routing the cells in essentially the same temporal order as the cells are transmitted from the input circuits to the switches.

18. The method of claim 17 wherein queuing includes receiving data in a multiplexer having a plurality of inputs and having an output coupled to each of the switches.

19. The method of claim 17, wherein transmitting includes receiving data in a demultiplexer having an input coupled to each of the switches and having a plurality of outputs.

20. The method of claim 17 wherein transmitting includes indicating a status associated with the input circuits;

selecting a particular one of the input circuits based upon the status; and sequentially selecting the switches.

21. The method of claim 20, further including assigning a number to the selection of the input circuit.

22. A method of transmitting cells through a multi-stage switch, comprising:

queuing a plurality of cells in a plurality of input circuits, each of the cells being destined for at least one of a plurality of output circuits; and transmitting the cells through a plurality of switches from a particular one of the input circuits containing that cell to the ones of the output circuits for which the cell is destined, by routing the cells based upon a pending status and a previous status of cells within the queues of the input circuits.

23. The method of claim 22 wherein queuing includes receiving data in a multiplexer having a plurality of inputs and having an output coupled to each of the switches.

24. The method of claim 22, wherein transmitting includes receiving data in a demultiplexer having an input coupled to each of the switches and having a plurality of outputs.

25. The method of claim 22 wherein transmitting includes sequentially selecting the switches.

26. The method of claim 25, further including assigning a number to the selection of the input circuit.

* * * * *